ELECTRONIC GANG SWITCHING SYSTEM

Original Filed April 21, 1960 2 Sheets-Sheet 1

INVENTOR
WENDELL S. MILLER
BY William P. Green
ATTORNEY

ELECTRONIC GANG SWITCHING SYSTEM

Original Filed April 21, 1960 2 Sheets-Sheet 2

INVENTOR
WENDELL S. MILLER
BY William F. Green
ATTORNEY

United States Patent Office

Re. 25,724
Reissued Feb. 9, 1965

25,724

ELECTRONIC GANG SWITCHING SYSTEM

Wendell S. Miller, 1341 Comstock Ave., Los Angeles 24, Calif.

Original No. 3,015,443, dated Jan. 2, 1962, Ser. No. 23,724, Apr. 21, 1960. Application for reissue Aug. 3, 1962, Ser. No. 215,227
20 Claims. (Cl. 235—164)

Matter enclosed in heavy brackets [ ] appears in the original patent but forms no part of this reissue specification; matter printed in italics indicates the additions made by reissue.

This invention relates to improved electronic computing apparatus, for performing any of various types of computing operations, and particularly adapted in certain respects for performing multiplication, with increased facility as compared with prior units for the same purpose. Some features of the present invention have been disclosed in my copending application Serial No. 476,127, now Patent No. 2,965,883, filed December 20, 1954 on "Electronic Gang Switches," of which the present case is a continuation-in-part.

In prior electronic multipliers, it has been very difficult to attain extremely high speed operation without unduly increasing the complexity of the computing apparatus. The fastest multipliers developed to date have been of the simultaneous operation type, in which a large number of multiplying circuits simultaneously perform a large number of partial multiplications each forming a part of the overall problem. The various partial products are then added together to arrive at the ultimate answer. Such simultaneous performance of all of the numerous parts of a complex multiplication problem must of course require a very large number of partial product circuits, and the overall computer must therefore be very large and expensive.

The amount of equipment required can be reduced by using, instead of the simultaneous type of operation, a step-by-step arrangement, in which the various partial multiplication steps are performed sequentially, rather than simultaneously. Such step-by-step performance of the multiplication problem of course requires a considerably greater time than does the simultaneous type of operation, and this increase in operational time becomes a very decided disadvantage when the problem or problems to be solved are of any complexity.

A major object of the present invention is to provide an arrangement for substantially reducing the amount of time required in performing a computation by the step-by-step method. This result is attained by a unique process of electronically examining the problem and automatically skipping over certain conventional steps which ordinarily require the expenditure of a substantial amount of time. This skipping process is based on the observation that usually the multiplier in a binary multiplication problem includes a number of zeros, which zeros of course require no addition process to be performed at that step. The present apparatus automatically responds to the presence of such zeros in a manner skipping completely over them, and doing to without even the minutest delay. In many problems, very few of the possible digit circuits are actually energized into a condition representing a number other than zero, and consequently such skipping of all of the zeros in a multiplier can reduce the number of multiplication steps, and the various add times required, to a small fraction of the time otherwise required in a conventional step-by-step system. In addition to this decided advantage which is attained by my novel computer system in a multiplication process, similar advantages in reduced operational time may be attained in performing other computing processes.

Structurally, a unit embodying the invention includes a first ordered series of input conductors or lines to which signals representing the multiplicand are applied, and a second ordered series of control conductors or lines to which signals representing the multiplier are applied. In conjunction with these input and control conductors, there is an array of logical "and" circuits or elements, each of which receives a signal from one of the input conductors and one of the control conductors. The various "and" circuits have associated therewith a series of adders which are associated with different sets of the "and" circuits. To define these sets technically and precisely, each set may be defined as including a first "and" circuit actuable by one of the input conductors and one of the control conductors, and as including all and only such other "and" circuits as are actuable respectively by pairs of conductors including an input conductor which is a predetermined number beyond the specified "one" input conductor in the ordered series of such conductors, and a control conductor which is the same number beyond the specified "one" control conductor in the ordered series of such control conductors. As will appear, this unique arrangement provides for an automatic shifting of the various partial products produced on different sets of the "and" circuits by the different control conductors, to give these partial products the proper relative weight on the ultimate adders and registers to which the final product is applied.

Certain specific features of the invention have to do with the novelty residing in the above discussed unique shifting or gang switching apparatus, as such. This apparatus can be employed in various other overall arrangements as well as in the particular combination disclosed herein.

A feature of particular importance in the invention resides in the manner in which the control conductors are automatically scanned to attain the previously discussed zero skipping action. To achieve this result, there are associated with the individual control conductors disabling means or circuits which are automatically operable to prevent the transmission of a signal from each of the control conductors to the "and" circuits responsive thereto as long as any preceding control conductor in the predetermined sequence of such conductors is connected to the "and" circuits for transmission of a signal thereto. Also, there are provided means for ceasing the transmission of a signal from each control conductor to the "and" circuits after the "and" circuits have been actuated thereby, so that the means disabling the next successive control conductor are automatically actuated to a condition permitting transmission of a signal from that control conductor to the "and" circuits.

The above and other features and objects of the present invention will be better understood from the following detailed description of the typical embodiments illustrated in the accompanying drawings in which.

Figure 1:
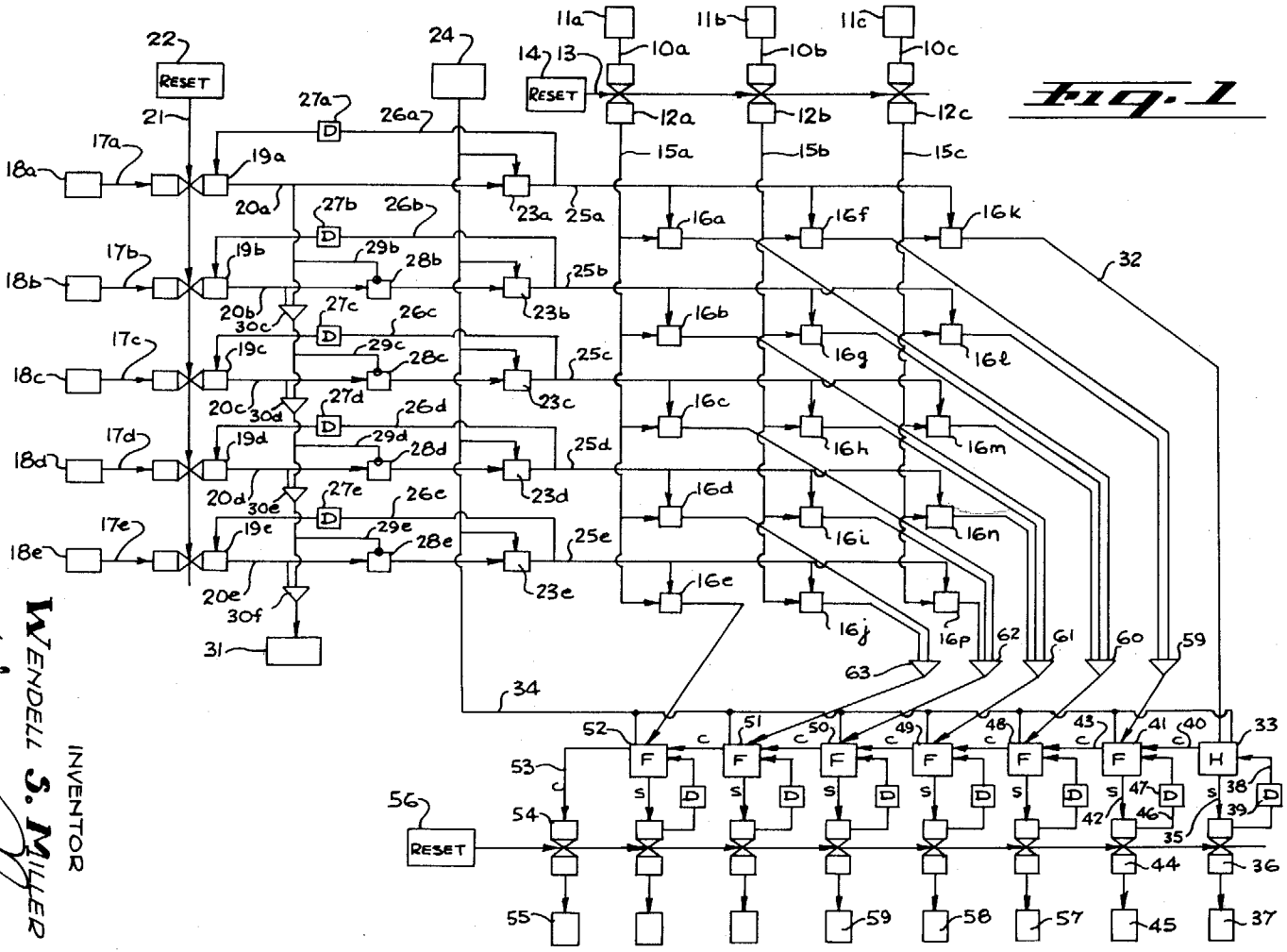
FIG. 1 is a schematic circuit diagram representing a first form of computer constructed in accordance with the invention.

Referring first to FIG. 1, I have represented at 10a, 10b and 10c a series of input conductors, to which electrical signals representing three digits of a multiplicand are supplied by three individual signal sources represented at 11a, 11b and 11c. Each of these sources 11a, 11b and 11c may typically be actuable between a first condition in which no electrical signal is applied to line 10a, 10b or 10c, to thereby represent the digit zero, and a second condition in which an electrical signal is supplied to the associated line, representing the digit 1. The three sources are simultaneously actuable, and may be actuated in any desired pattern, to represent any desired arrangement of the digits zero and 1. A momentary application of a signal to any one of the lines 10a, 10b or 10c is sufficient to actuate the associated bi-stable multivibrator or flip-flop circuit 12a, 12b or 12c from a first state representing the digit zero to a second stable state representing the digit 1. The bi-stable circuit 12a, 12b or 12c will then remain in that second state, in spite of the termination of the signal on line 10a, 10b or 10c, and until the application of a reset signal through line 13 from a re-set signal source represented at 14. The output signals from bi-stable circuits 12a, 12b and 12c are applied to lines 15a, 15b and 15c, which conduct the signals from the bi-stable circuits to an array or matrix of "and" circuits 16a, 16b, 16c, 16d, etc. As will be apparent, whenever one of the flip-flop circuits 12a, 12b or 12c is actuated by a signal on the input line leading thereto, the flip-flop circuit acts to produce an output signal in the associated line 15a, 15b or 15c.

The various digits of the multiplier are applied to a series of "control" conductors 17a, 17b, 17c, 17d and 17e, which are separately energizable by a series of control signal sources 18a, 18b, etc. As in the case of the input conductors, each of these control conductors 17a, 17b, etc. acts when energized by a control signal to actuate an associated bi-stable multivibrator or flip-flop circuit 19a, 19b, 19c, 19d or 19e from a normal state in which no signal is provided in output line 20a, 20b, 20c, 20d or 20e, to an actuated state in which an output signal is provided in the associated one of these output lines. The bi-stable circuits 19a, 19b, etc. are subsequently actuable back to the original state by a re-set signal applied through line 21 from a re-set signal source represented at 22.

The output signal from each of the lines 20a, 20b, etc. is fed into an additional "and" circuit 23a, 23b, 23c, 23d or 23e, which also receives intermittent signals from a clock-pulse generator 24. The electrical signals from the clock-pulse generator may be timed regularly or irregularly, as desired, and function intermittently to cause the transmission of control signals to the array of "and" circuits 16a, 16b, 16c, etc. More particularly, each of the secondary "and" circuits 23a, 23b, 23c, etc. is adapted, in response to the application of simultaneous signals or pulses from clock-pulse generator 24 and the associated line 20a, 20b, 20c, 20d, or 20e, to produce an output signal in the connected line 25a, 25b, 25c, 25d or 25e (assuming that there is no inhibiting signal applied on the later-to-be-discussed lines *29b*, *29c*, *29d* and *29e* respectively). The output signals of these lines 25a, 25b, etc. are conducted to the "and" circuits 16a, 16b, 16c, etc. in the arrangement shown. Each of the lines 25a, 25b, 25c, etc. is connected by a line 26a, 26b, 26c, 26d or 26e to the associated bi-stable circuit 19a, 19b, etc., with delay units 27a, 27b, 27c, etc. being connected into these lines. Each of the lines 26a, 26b, etc. thus conducts back to the associated flip-flop circuits 19a, 19b, etc. a signal which automatically re-sets that flip-flop circuit to its initial no output state after a sufficient period of time has expired, following the production of an output by the connected circuit 23a, 23b, etc., to prevent the performance of two multiplication steps on a single pulse of the clock-pulse generator 24.

Connected into each of the lines 20b, 20c, 20d and 20e, there is provided an "and not" circuit 28b, 28c, 28d or 28e, to which disabling or inhibiting lines 29b, 29c, 29d and 29e are connected. The first of these circuits 28b is adapted to transmit a signal to "and" circuit 23b so long as a signal is applied to its input side 20b "and not" to the disabling line 29b. Line 29b is electrically connected to the preceding or next upper line 20a, so that "and not" circuit **28*b* will not permit a signal to be transmitted to line 25b while line 20a is energized. Similarly, the next lower "and not" circuit 28c is connected to the output side of an "or" circuit 30c, whose two inputs are connected to line 20a and line 20b respectively, so that a signal is applied to inhibiting line 29c as long as either line 20a or 20b is energized, and therefore in either of these instances, it is impossible for a signal to be transmitted to "and" circuit 23c. Without discussing the other two "and not" circuits 28d and 28e, and the other two "or" circuits 30d and 30e, individually, it will be apparent that each inhibiting circuit prevents the energization of each of the lines 20b, 20c, 20d, and 20e so long as any one of the preceding (higher) lines 20a, 20b, 20c, etc. is energized by a control signal. A final "or" circuit 30f may connect with further inhibiting circuits associated with additional control conductors, or may actuate an indicator or an automatic control represented at 31, for indicating to an operator when all of the lines 20a, 20b**, etc. have been de-energized, and the multiplying operation has therefore been completed.

The output from "and" circuit 16k is conducted by a line 32 to a half adder 33, whose operation is timed by the pulses brought through line 34 to the adder from clock-pulse generator 24. Circuit 16k is adapted to produce an output as long as signals are supplied thereto from input line 15c and control conductor 25a simultaneously. Each energization of line 32, together with a pulse from clock line 34, causes adder 33 to energize sum line 35 and thereby actuate bi-stable flip-flop circuit 36 of the product register 36, 44, etc. to a condition for applying to the digit output circuit 37 the addition product produced by adder 33. Partial product line 38, having a delay 39 connected thereinto, returns the product information to adder 33. The "carry" information is transmitted by "carry" line 40 to the next successive adder 41. This adder has associated with it a sum line 42, "carry" line 43, multi-vibrator circuit 44, output circuit 45, partial product digit line 46, and delay 47 corresponding to the similar circuit elements associated with the first adder 33. The same is true of all of the subsequent adders 48, 49, 50, 51 and 52, with the "carry" line 53 of the final adder being applied to a final flip-flop circuit 54, which controls an output circuit 55. All of the flip-flop circuits 36, 44, 54, etc. are actuable to a normal condition by a re-set signal applied by a re-set signal source represented at 56. The adder 33 and product register 37 normally represent the first digit of the final product of a multiplication process, while the other adders and registers 41 and 45, etc. over to 54–55 represent the higher digits. For example, output circuit 37 may represent ones, output circuit 45 may represent twos, circuit 57 may represent fours, circuit 58 may represent eights, and the other output circuits may represent sixteens, thirty-twos, sixty-fours, and one-hundred twenty-eights, respectively.

Full adder 41 is actuable by the output from an "or" circuit 59, whose inputs come from "and" circuits 16f and 16l respectively. That is, production of a signal by either of the "and" circuits 16f or 16l (resulting from energization of the two inputs to such circuit simultaneously) will actuate "or" circuit 59 to cause adder 41 to add 1 in that place to the product represented by the register.

The third adder 48 is actuable through an "or" circuit 60 by energization of any one of the three "and" circuits 16a, 16g or 16m. Similarly, adder 49 is actuable through "or" circuit 61 by any one of the "and" circuits 16b, 16h or 16n. Adder 50 is actuable by the output from an "or" circuit 62, upon production of an output signal by any one of the "and" circuits 16c, 16i or 16p. Adder 51 is actuable through "or" circuit 63 by "and" circuit 16d or 16j, and the final adder 52 is actuable by the final "and" circuit 16e.

As has been mentioned previously, considering the input conductors 10a, 10b and 10c as an ordered series of such conductors, and considering the control conductors 17a, 17b, 17c, 17d and 17e as an ordered series of control conductors, then the sets of "and" circuits 16a, etc. to which the different adders are responsive may be defined as follows: Each set consists of a first "and" circuit actuable by one of the input conductors and one of the control conductors, together with all and only such other "and" circuits as are actuable respectively by pairs of conductors including an input conductor which is a predetermined number beyond the "one" input conductor in the ordered series of input conductors, and a control conductor which is the same number beyond the "one" control conductor in the ordered series of such control conductors.

To now describe the manner of operation of the arrangement shown in FIG. 1, assume that it is desired to multiply two numbers together. In the illustrated arrangement, the multiplicand may be assumed to consist of three digits, in binary form, while the multiplier consists of five digits in binary form. It will of course be appreciated that the illustrated three by five array of "and" circuits is shown as only a typical arrangement, and any desired number of such circuits may be employed, for multiplying numbers having any number of digits.

Signals representing the three digits of the multiplicand, in binary form, are applied to input conductors 10a, 10b and 10c respectively. It is assumed that each of these digits will be either a zero (no potential applied to the input conductor) or a 1 (in which case an electrical signal is normally applied to the input conductor). Similarly, signals representing the five binary digits of the multiplier are applied to the five control conductors 17a, 17b, 17c, etc. If the signal applied to line 17 is such as to actuate flip-flop circuit 19a to a condition producing an output in line 20a, then the application of that signal in line 20a will act through disabling circuits 28b, 28c, 28d and 28e to prevent the transmission of signals to lines 25b, 25c, 25d and 25e. Consequently, when clock 24 is placed in operation and produces a first pulse, the addition of that pulse to the signal in line 20a acts through "and" circuit 23a to produce an output in line 25a. If flip-flop circuit 12a is in an actuated condition producing a signal in line 15a, that signal will add to the signal from line 25a and produce an output actuating "or" circuit 60 and adder 48 to register a "one" on the accumulator 57. If no signal is present on line 15a, then the adder 48 is not energized. Similarly, adders 41 and 33 are actuated by "and" circuits 16f and 16k, in accordance with the signal provided by associated line 15b or 15c.

As soon as the circuit 23a energizes line 25a, the signal on line 25a is communicated back through line 26a to delay element 27a. After a predetermined short delay period, unit 27a actuates bi-stable circuit 19a to its original condition in which no output is provided on line 20a. The delay introduced in this manner is just sufficient to prevent the energization of the next successive line 20b until after the first clock-pulse has been terminated, to thereby prevent the actuation of two rows of "and" circuits 16a, etc. simultaneously.

While a signal is present on line 20a, all of the other lines 25b, 25c, 25d and 25e are maintained free of any signal which could actuate their associated "and" circuits 16b, etc., by virtue of the inhibiting characteristic of the signals supplied from line 20a to disabling circuits 28b, 28c, 28d and 28e. As soon as the bi-stable circuit 192 has been returned to a condition in which it no longer supplies an inhibiting signal to line 20a, disabling circuit 28b becomes ineffective to prevent the transmission of a signal to line 25b, and consequently if bistable circuit 19b is in a condition to produce an output in line 20b, that output is transmitted to line 25b and to the associated "and" circuits 16b, 16g and 16l. At the same time, this signal will inhibit all of the other successive lines 20c, 20d and 20e from transmitting their signals to lines 25c, 25d and 25e. The signal on line 25b (at the time of the next clock-pulse) will combine with whatever signals are present on lines 15a, 15b or 15c to actuate or not actuate "and" circuits 16b, 16g and 16l, in accordance with the signals applied to lines 15a, 15b and 16c. As in the case of the first control conductor, a delay re-set signal is applied through line 26b to bi-stable circuit 19b, to automatically remove the signal from line 20b after a predetermined interval sufficient to avoid simultaneous actuation of two control lines, to then allow the next successive control line to energize its associated "and" circuits. This successive actuation of the different horizontal rows of "and" circuits continues until the bottom row 16e, 16j and 16p is energized, at which time the signal from the final line 20e is removed, and this condition is indicated by unit 31 which shows that the multiplication process has been completed. If any one or more of the control lines 126a, 126b, etc. are in a "zero" condition (do not have "one" signals applied thereto) then the inhibiting circuitry acts to automatically skip over any such lines, and in each case skip down to the next successive control line which does carry a "one" signal, without attempting to perform useless adding operations at the zero lines. This avoids wasted intervals of time, and thus greatly speeds up the overall multiplication process.

By virtue of the pattern in which the different "and" circuits 16a, etc. are connected to the adders or readout circuits 33, etc., each successive horizontal row of the "and" circuits acts to automatically shift the effect of the different input conductors 15a, 15b and 15c to the left one step. That is, whereas the three circuits 16a, 16f and 16k of the top row are associated with the three right adders 48, 41 and 33 respectively, the "and" circuits 16b, 16g and 16l of the next row are associated respectively with adders 49, 48 and 41. Similarly, each succeeding row of the "and" circuits is associated with adders which are shifted another step to the left. As all of the partial multiplications are effected by energization of the lines 17a, 17b, 17c in sequence, the various partial products are applied to the adders in progressively shifted positions, and are added together by the adders to produce on the product register the ultimate product of the overall multiplication process. After this process has been completed, all of the various bi-stable circuits are re-set by energization of the different re-set circuits 14, 22 and 56.

In FIG. 1, the elements disclosed are logical elements in their most general sense, and the "and" circuits 16a, 16b, 16c, etc. are intended to represent any logical elements operable to produce outputs corresponding to binary "one" digits in response to the presence of a signal on a corresponding input line 15a, 15b, 15c representing a binary "one," and a signal on the corresponding control line 20a, 20b, 20c, etc. representing a binary "one," if permitted by the balance of the control circuitry.

Figure 2:
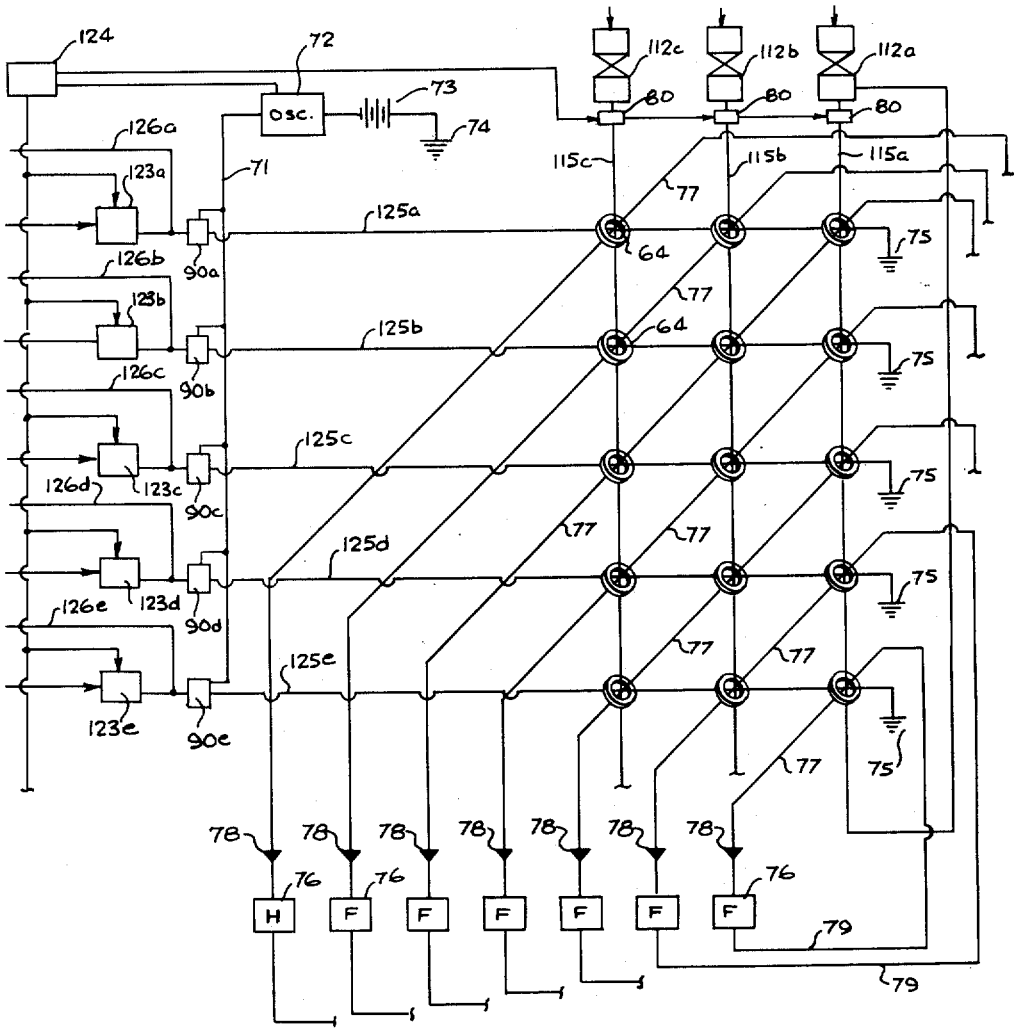
FIG. 2 is a partial diagrammatic representation of a second form of computer embodying the invention.

FIG. 2 represents fragmentarily a second form of the invention, in which the functions of the "and" circuits 16a, 16b, etc., and the "or" circuits 59, 60, 61, 62, and 63 are performed by a matrix of magnetic cores 64. These cores may take the form of small rings of magnetizable material, preferably selected to have a hysteresis loop of the high loss type illustrated in FIG. 3. This loop is desirably of the illustrated essentially rectangular configuration, having a sharp bend or "knee" at points 65 and 66, and having substantially horizontal bottom and top sides 67 and 68 and two substantially vertical sides 69 and 70.

The numbers 123a, 123b, 123c, 123d and 123e in FIG. 2 represent "and" circuits corresponding to those shown at 23a, 23b, 23c 23d and 23e in FIG. 1. The inputs to these "and" circuits are the same as shown in FIG. 1, and all of the rest of the apparatus illustrated to the left of circuits 23a, etc. in FIG. 1 is to be considered as present in FIG. 2, but for simplicity of illustration has been deleted from the drawing. Similarly, the delayed re-set lines 126a, 126b, 126c, 126d and 126e all correspond to lines 26a, 26b, etc. of FIG. 1, and function in the same manner.

The output from "and" circuits 123a, 123b, etc. in FIG. 2 controls a series of electric switches represented at 90a, 90b, 90c, 90d and 90e. One side of each of these switches is connected to a common line 71, while the second sides of the switches are connected to five individual conductors 125a, 125b, 125c, 125d and 125e passing through the various cores 64 in the arrangement shown. Into line 71 there are connected in series an oscillator 72 for producing a sinusoidal alternating current output, and a direct current biasing power source represented at 73 as a battery. One side of the battery is grounded at 74, as are the right ends of conductors 125a, 125b, etc. at 75. Thus, switch 90a is connected into a series circuit with the oscillator 72 and battery 73, and acts to close the circuit from the two power sources 72 and 73 to line 125a, and produce a flow of current therethrough, whenever "and" circuit 123a is energized in the manner discussed in connection with circuit 23a of FIG. 1. Similar circuits are formed including each of the other switches 90b, 90c, etc., and the power sources, together with the associated conductors 125b, 125c, 125d and 125e. Each of the horizontal conductors 125a, etc. passes through one of the horizontal rows of cores 64, while each of the input conductors 115a, 115b and 115c passes through one of the vertical columns of cores. The three input conductors 115a, 115b and 115c are connected to three bi-stable circuits 112a, 112b and 112c, corresponding to circuits 12a, 12b and 12c of FIG. 1, and actuated in the same manner. Line 115a is shown as extending downwardly through the cores, and then returning to bi-stable energizing circuit 112a to form a complete circuit for passing current through the associated vertical row of cores whenever bi-stable circuit 112a is in its actuated condition. Similar complete circuits are provided in conjunction with each of the lines 115b and 11c, but have been shown only partially in the drawing to avoid undue complication. The various adders 76 of FIG. 2 may be identical with the adders 33, etc. of FIG. 1, and may have output circuits, bi-stable circuits, sum lines, carry lines, partial product lines, etc. associated therewith in the same pattern shown in FIG. 1. The adders are actuated by read-out conductors 77 which extend through the cores in a diagonal pattern corresponding essentially to the pattern of the read-out lines 32, etc. in FIG. 1, to produce the same automatic shifting effect. Each of the read-out lines 77 may have a diode or other rectifier 78 connected into the circuit, to provide pulses in only one direction to the adders, and each read-out line may have associated therewith a return line as shown at 79 in connection with two of the adders, for completing the read-out circuit.

Each of the cores 64 is so designed that a combination of two pulses or signals in the two associated input and control conductors (for example 115a and 125a, or 115b and 125a, etc.) will be sufficient to actuate the core in question from a predetermined normal magnetic state to a second and opposite magnetic state. However, one of these pulses alone can not effect such an actuation. When the core is thus actuated, the change in magnetic state functions to produce in the associated read-out line 77 an output signal which is transmitted to one of the adders to be recorded thereby.

Figure 3:
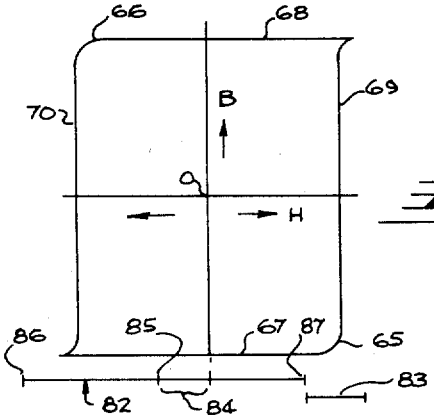
FIG. 3 is a representation of the substantially rectangular hysteris loops of the magnetic cores of the FIG. 2 arrangement.

Each of the cores 64 is normally maintained magnetized in a predetermined direction, typically the direction of the magnetic state represented by the lower line 67 in the FIG. 3 hysteresis loop. To simplify the discussion, this magnetic state represented at 67 may be termed a "negtive" magnetic state, or negatively driven state, while the condition represented by upper line 68 may be called a "positive" state. As will be understood, in order to actuate any one of the cores from negative state 67 to positive state 68, the magnetizing force H or magnetizing current must be sufficiently great to drive the core past bend 65 of the hysteresis loop, far enough so that the core changes to the positive state represented at 68. The pulses fed to input lines 115a, 115b and 115c are insufficient by themselves to cause the cores to so pass bend 65, but will do so in combination with pulses from the horizontal control lines. The input signals supplied to lines 115a, 115b and 115c are converted to pulses by connection of switches 80 into these conductors, with these switches being controlled by clock-pulse generator 124. The current signals which pass through lines 115a, 115b and 115c are uni-directional or direct current pulses.

A.C. oscillator 72 is connected to clock-pulse generator 124, to synchronize the alternating current produced by oscillator 72 with respect to the pulses from unit 124, and the signals in lines 115a, 115b and 115c.

In FIG. 3, I have represented at 82 the D.C. biased alternating current sinusoidal wave which is fed to control conductors 125a, 125b, 125c, etc. by oscillator 72 and battery 73, and I have represented at 83 the D.C. pulses which are fed to the vertical lines 115a, 115b, and 115c. The signal 82 has a D.C. component 84 supplied by attery 73, which component shifts the center of the A.C. cycle leftward to the point 85 in FIG. 3. The A.C. component is preferably greater than the D.C. component. The combined A.C. and D.C. components of signal 26 provide a magnetizing force H which fluctuates between a left limit 86 and a right limit 87. When signal 82 reaches its left limit 86, the magnetizing force H is sufficiently great in a negative direction to cause associated core 64 to magnetically pass upper bend 66 of the hysteresis loop, and thus actuate the core to its negative driven state represented at 67. This is true even though there may be no pulse 83 supplied by the associated vertical wire 115a, 115b or 115c. However, the other extremity of pulse 82 in FIG. 3, that is, the right extremity represented at 84, does not provide a sufficient magnetizing force H to pass bend 65 of the hysteresis loop and thus actuate the core to its positive state 68. Consequently, unless a pulse 83 is supplied to the corresponding vertical wire 115a, 115b or 115c, the core is not actuated to its positive state, even though a signal 82 is present. The pulses 82 thus serve to maintain each core 64 in its negative state 67, until a pulse 83 is supplied simultaneously on the associated vertical wire 115a, 115b or 115c, at which time the combination of signals actuates the core to its positive state 68, following which the signal 82 acts to return the core to its negative driven state 67 (the pulse in line 115a, 115b or 115c being terminated by the clock pulse generator prior to the termination of the biased alternating current signal 82).

The functioning of the FIG. 2 arrangement will be apparent. To perform a multiplication operation, first of all the multiplicand digits are applied to bi-stable circuits 112a, 112b and 112c, and the multiplier digits are applied to control signal sources corresponding to those shown at 18a, 18b, 18c, 18d and 18e in FIG. 1. The automatic sequential control circuit or scanning circuit having the various disabling circuits 28*b*, etc., as shown in FIG. 1, causes the "and" circuits 123a, 123b, 123c, etc. of FIG. 2 to be sequentially energized, upon successive actuations of clock-pulse generator 124, and in a manner skipping any control circuits on which a zero signal is present. The first pulse from the clock-pulse generator 124 energizes "and" circuit 123a (if a control signal has been applied thereto), and thereby commences a cycle of the D.C. biased alternating current represented at 82 in FIG. 2. Simultaneously, the same clock-pulse actuates switches 80 to supply D.C. pulses to such of the vertical lines 115a, 115b and 115c as have had their bi-stable circuits 112a, 112b and 112c actuated by input signals supplied thereto. Clock pulse generator 124 so synchronizes the D.C. pulses 83 with oscillator 73 as to assure that each pulse 83 adds to or supplements the correspondingly directed portion of the D.C. biased A.C. signal 82. That is, pulse 83 occurs while the current of signal 82 is in a direction such that the magnetizing effect of the signal 82 is in the same direction as that of pulse 83. Thus, these two combined pulses cause the core to shift to its positive state 68, following which the pulse 83 terminates as signal 82 reverses to a negative state, so that signal 82 then returns the core to its negative state 67 until the next pulse 83 occurs in that particular core. Such actuation of a core 64 to its positive state 68 creates a magnetic field in the vicinity of that core which induces an electrical current in the corresponding read-out line 77, to thus energize an associated one of the adders or read-out circuits 76. The diagonal arrangement of the read-out lines as they pass through the core matrix functions as in FIG. 1 to cause a successive shifting of the results of the different partial multiplication steps, so that the ultimate product is recorded by the registers or accumulators associated with adders 76.

For the purpose of clarifying the meaning of the "physical state" of an object, as used in the claims appended hereto, it is to be noted that "physical state" in its broad sense refers to the composition and configuration of the object, and the values of the physical parameters to which it may be subjected, such as electric field, electric potential, magnetic field, temperature, etc.

I claim:

1. Computer apparatus comprising an ordered series of input conductors, means for supplying electrical input signals to a plurality of said input conductors simultaneously and in any of several different combinations of the different input conductors, an ordered series of separately energizable control conductors, an array of logical "and" circuits each responsive to one of said input conductors and one of said control conductors and each operable to produce a predetermined output signal in response to a predetermined combination of input and control signals from the associated input conductor and control conductor but not in response to only one of said signals, a plurality of read-out circuits actuable by different sets of said "and" circuits, each of said read-out circuits being actuable by any one of the "and" circuits in an associated set thereof which may be defined as including a first "and" circuit actuable by one of said input conductors and one of said control conductors, and as including all and only such other "and" circuits as are actuable respectively by pairs of conductors including an input conductor which is a predetermined number beyond said one input conductor in said first mentioned series and a control conductor which is the same number beyond said one control conductor in said second mentioned series, and scanning circuitry for controlling the transmission of signals from said control conductors to the "and" circuits and operable to pass said signals from the control conductors in a predetermined sequence of the control conductors, said scanning circuitry including disabling means operable to prevent the transmission of a signal from each of said control conductors to the "and" circuits responsive thereto as long as any preceding control conductor in said sequence is connected to the "and" circuits for transmission of a signal thereto, said disabling means being automatically operable to pass a signal from a particular control conductor when the preceding control conductors are no longer connected to the "and" circuits, and said scanning circuitry including means for ceasing the transmission of a signal from each control conductor to the "and" circuits after the "and" circuits have been actuated thereby.

2. Computer apparatus as recited in claim 1, in which said read-out circuits are a plurality of adders each actuable by any one of the "and" circuits in an associated one of said sets.

3. Computer apparatus as recited in claim 1, in which said read-out circuits are a plurality of adders each actuable by any one of the "and" circuits in an associated one of said sets, and a plurality of individual registers actuable by said adders respectively.

4. Computer apparatus as recited in claim 1, in which said read-out circuits are a plurality of adders each actuable by any one of the "and" circuits in an associated one of said sets, and a plurality of individual registers actuable by said adders respectively, each of said adders having a sum line connected to and adapted to actuate the associated register, and having a carry line extending to the next successive one of said adders.

5. Computer apparatus as recited in claim 1, in which said scanning circuitry includes a clock pulse generator for timing the intervals at which signals are transmitted from the control conductors to the "and" circuits.

6. Computer apparatus as recited in claim 1, in which said scanning circuitry includes a plurality of additional "and" circuits interposed between said control conductors respectively and the first mentioned "and" circuits, and a clock pulse generator supplying intermittent timing signals to said additional "and" circuits to control the intervals at which signals from the control conductors are transmitted to the "and" circuits.

7. Computer apparatus as recited in claim 1, in which said disabling means include a plurality of "and not" circuits interposed between said control conductors respectively and said "and" circuits and each having a disabling connection to the preceding control conductors in said sequence acting to disable a particular control conductor against transmission of a control signal to the "and" circuits as long as a signal is received from one of the preceding control conductors.

8. Computer apparatus as recited in claim 1, in which said "and" circuits are a matrix of magnetic cores having conductors in flux linkage relation therewith carrying said input and control signals, each of said cores being actuable between two different magnetic states by a combination of one input signal and one control signal but not by less than said combination.

9. Computer apparatus as recited in claim 8, in which said read-out circuits are a plurality of adders each actuable by any one of the "and" circuits in an associated one of said sets, and a plurality of individual registers actuable by said adders respectively.

10. An electronic gang switch comprising an ordered series of input conductors adapted to be separately energized, electrical signal supplying means for energizing said input conductors and adapted to supply input signals to a plurality of the input conductors simultaneously in any of several different possible combinations of the different input conductors, an ordered series of control conductors adapted to be separately energized, a matrix of individual elements each responsive to one of said input conductors and to one of said control conductors, each of the individual elements being adapted to be actuated from one physical state to a second physical state by a combination of simultaneous signals in those input and control conductors to which it responds, but not being so actuable by less than said combination of signals, and a plurality of individual read-out units actuable by the change in physical state of the elements, each of said read-out units being associated with a set of said elements which may be defined as including a first element associated with one of said control conductors and one of said input conductors, and as including all and only such other elements as are actuated by pairs of conductors including an input conductor which is a predetermined number beyond said one input conductor in said first mentioned series and a control conductor which is the same number beyond said one control conductor in said second mentioned series.

11. An electronic gang switch comprising an ordered series of input conductors, adapted to be separately energized, an ordered series of control conductors adapted to be separately energized, a matrix of individual electrically responsive elements each responsive to one of said input conductors and to one of said control conductors, each of the individual elements being adapted to be actuated from one physical state to a second physical state by a combination of simultaneous signals in those input and control conductors to which it responds, but not being so actuable by less than said combination of signals, electrical signal supplying means for energizing said input conductors and adapted to supply input signals to a plurality of the input conductors simultaneously in any of several different possible combinations of the different input conductors, means operable to selectively energize any of said different control conductors, a plurality of individual read-out conductors energizable by said change in physical state of the elements, a plurality of different read-out circuits actuable separately by said different read-out conductors respectively, said read-out conductors being arranged so that a predetermined plurality of the different read-out circuits will be simultaneously actuated when a particular control conductor and a particular group of input conductors are energized, each of said read-out conductors being associated with a set of said elements which may be defined as including a first element associated with one of said control conductors and one of said input conductors, and as including all and only such other elements as are actuated by pairs of conductors including an input conductor which is a predetermined number beyond said one input conductors in said first mentioned series and a control conductor which is the same number beyond said one control conductor in said second mentioned series.

12. An electronic gang switch comprising an ordered series of input conductors adapted to be separately energized, an ordered series of control conductors adapted to be separately energized, a matrix of individual cores each positioned in flux linkage relation to one of said input conductors and one of said control conductors, each of the individual cores being adapted to be actuated from one magnetic state to a second magnetic state by a combination of simultaneous signals in the input and control conductors which are in flux linkage relation therewith, but not being so actuable by less than said combination of signals, electrical signal supplying means for energizing said input conductors and adapted to supply input signals to a plurality of the input conductors simultaneously in any of several different possible combinations of the different input conductors, a plurality of individual read-out conductors passing in flux linkage relation to different ones of said cores, and a plurality of different read-out circuits actuable separately by said different read-out conductors respectively, said read-out conductors being arranged so that a predetermined plurality of the different read-out circuits will be simultaneously actuated when a particular control conductor and a particular group of input conductors are energized, each of said read-out lines being associated with a set of said cores which may be defined as including a first core in flux linkage relation with one of said input conductors and one of said control conductors, and as including all and only such other cores as are in flux linkage relation respectively with pairs of conductors including an input conductor which is a predetermined number beyond said one input conductor in said first mentioned series and a control conductor which in the same number beyond said one control conductor in said second mentioned series.

13. An electronic gang switch as recited in claim 12, in which said cores are formed of magnetizeable material having high loss substantially rectangular hysteresis loops.

14. An electronic gang switch as recited in claim 12, in which said cores are formed of magnetizeable material having high loss substantially rectangular hysteresis loops and arranged essentially in rows extending in predetermined "X" and "Y" directions, said input and control conductors extending in said "X" and "Y" directions respectively and along said rows.

15. An electronic gang switch as recited in claim 12, including a composite control signal source supplying electrical signals to said control conductors selectively and including a first source supplying an A.C. wave and a second source superimposing a D.C. component on said A.C. wave to form a composite control signal which by itself actuates said cores to said one state, said input signal sources supplying D.C. pulses to the input conductors in a direction tending to magnetize the cores oppositely from said D.C. components of the control signal and of an intensity serving with said composite control signals to energize the cores to said second magnetic state, and synchronizing means for timing said D.C. input pulses to occur simultaneously with the portion of the A.C. cycle of said control signal which is in the same direction as said input pulses.

16. Computer apparatus comprising an ordered series of input conductors, means for supplying electrical input signals to a plurality of said input conductors simultaneously and in any of several different combinations of the different input conductors, an ordered series of separately energizable control conductors, an array of logical "and" elements each responsive to one of said input conductors and one of said control conductors and each operable to produce a predetermined output signal in response to a predetermined combination of input and control signals from the associated input conductor and control conductor but not in response to only one of said signals, a plurality of readout units actuable by different sets of said "and" elements, each of said read-out units being actuable by any one of the "and" elements in an associated set thereof which may be defined as including a first "and" element actuable by one of said input conductors and one of said control conductors, and as including all and only such other "and" elements as are actuable respectively by pairs of conductors including an input conductor which is a predetermined number beyond said one input conductor in said first mentioned series and a control conductor which is the same number beyond said one control conductor in said second mentioned series, and scanning means for controlling the transmission of signals from said control conductors to the "and" elements and operable to pass said signals from the control conductors in a predetermined sequence of the control conductors, said scanning means including disabling means operable to prevent the transmission of a signal from each of said control conductors to the "and" elements responsive thereto as long as any preceding control conductor in said sequence is connected to the "and" elements for transmission of a signal thereto, said disabling means being automatically operable to pass a signal from a particular control conductor when the preceding control conductors are no longer connected to the "and" elements, and said scanning means including means for ceasing the transmission of a signal from each control conductor to the "and" elements after the "and" elements have been actuated thereby.

*17. A logical information handling system comprising a plurality of input lines, a plurality of control lines, a matrix of logical elements each normally in a predetermined condition and operable from said predetermined condition to a second condition and then back to said predetermined condition in response to complementary signals on corresponding sets of said input lines and said control lines, means for supplying said complementary signals to said input lines and said control lines and operable only through a complete two-way cycle to always return said elements to said predetermined condition after actuation to said second condition, a plurality of different readout lines actuable by different groups respectively of said logical elements during at least a portion of their period of actuation from said predetermined condition to said second condition and back to said predetermined condition, whereby actuation of any one of a plurality of said elements in a particular one of said groups will actuate a corresponding one of said readout lines but not another*

*of the readout lines, and separate readout units responding to said readout lines respectively to produce different ultimate responses of the overall information handling system to actuation of said lines.*

*18. An electronic gang switch comprising a series of input conductors adapted to be separately energized, electrical signal supplying means for energizing said input conductors and adapted to supply input signals to a plurality of the input conductors simultaneously in any of several different possible combinations of the different input conductors, a series of control conductors adapted to be separately energized, a matrix of individual elements each responsive to one of said input conductors and to one of said control conductors, each of the individual elements being adapted to be actuated from one physical state to a second physical state and back to said first state by a combination of simultaneous signals in those input and control conductors to which it responds, but not being so actuable by less than said combination of signals, and a plurality of different readout lines actuable by the change in physical state of the elements in different groups respectively of said elements, whereby actuation of any of a plurality of said elements in a particular one of said groups between said physical states will actuate a corresponding one of said readout lines but not another of the readout lines, and separate readout units responding to said readout lines respectively to produce different ultimate responses of the overall gang switch to actuation of said readout lines.*

*19. In a computing device wherein information expressed by a series of coded bits arranged in columnar array is transmitted from place to place, a column shift device consisting of a matrix of magnetic binaries having columnar inputs each threaded through a different row of said binaries in one coordinate direction and each given a different digital value, a plurality of column shift control inputs each threaded through a different row of said binaries in another coordinate direction and each given a different digital value, and a plurality of columnar outputs each shifted in space from the said columnar inputs and each threaded through a plurality of said binaries each of which is identified by a digital value having a predetermined relation to the digital values of its columnar input and its column shift control input, and means for successively transferring a plurality of bits in columnar array to a different columnar array consisting of means for successively enabling said columnar inputs and coincidentally pulsing a given one of said control inputs.*

*20. A logical information handling system comprising a plurality of input lines, a plurality of control lines, a matrix of logical elements each normally in a predetermined condition and operable from said predetermined condition to a second condition in response to complementary signals on corresponding sets of said input lines and said control lines, means for supplying return signals to one of said sets of lines of a value to actuate said logical elements from said second condition back to said predetermined condition without assistance from complementary signals on the other set of lines, a plurality of different readout lines actuable by different groups respectively of said logical elements during at least a portion of their period of actuation from said predetermined condition to said second condition and back to said predetermined condition, whereby actuation of any one of a plurality of said elements in a particular one of said groups will actuate a corresponding one of said readout lines but not another of the readout lines, and separate readout units responding to said readout lines respectively to produce different ultimate responses of the overall information handling system to actuation of said lines.*

References Cited by the Examiner

The following references, cited by the Examiner, are of record in the patented file of this patent or the original patent.

UNITED STATES PATENTS 2,691,156 10/54 Saltz et al. ---------- 340—174

MALCOLM A. MORRISON, *Primary Examiner.*

WALTER W. BURNS, Jr., *Examiner.*